Aug. 8, 1950 P. A. SCHMIDT 2,517,722
WIRE WINDING APPARATUS
Filed May 31, 1946
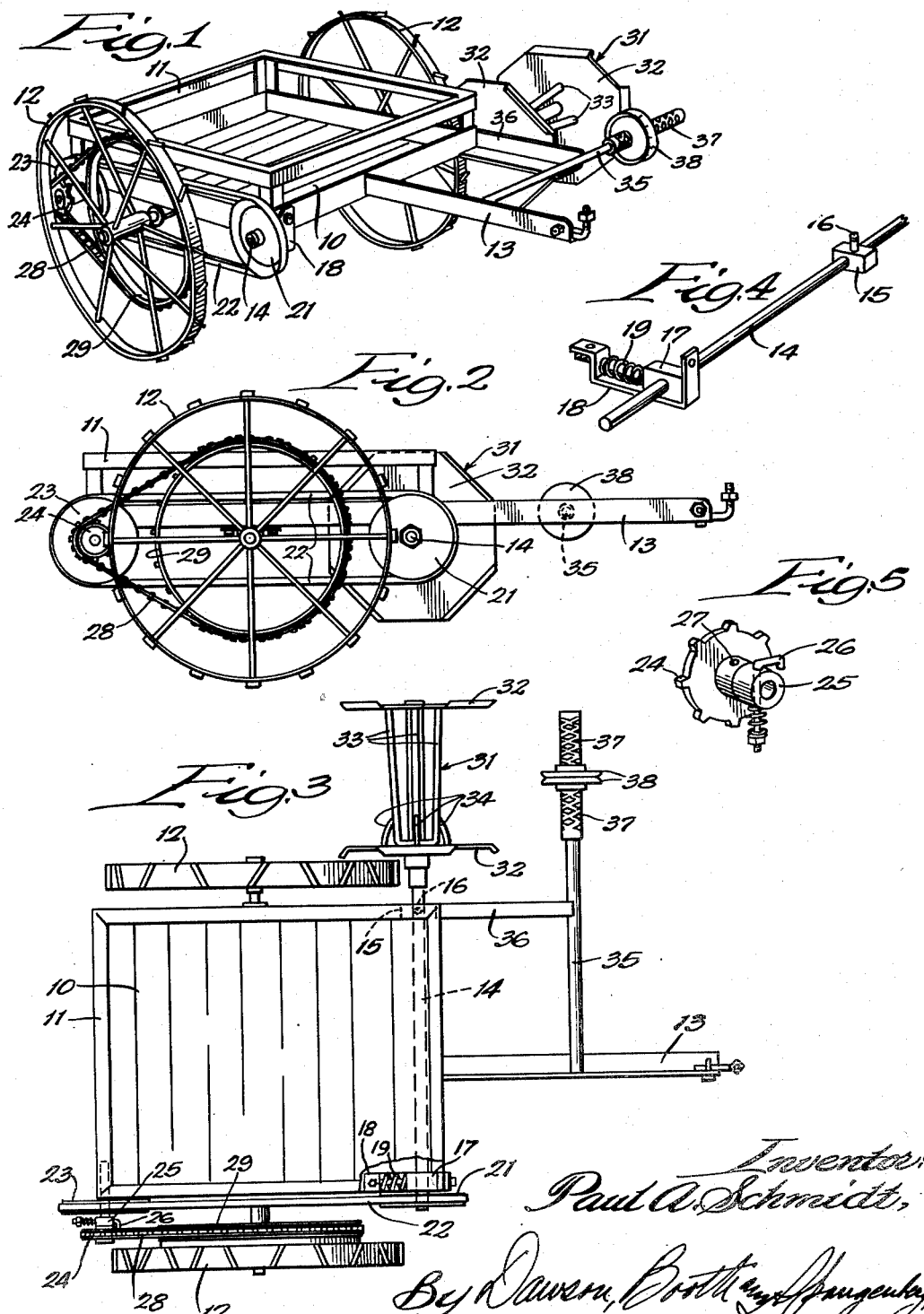
Inventor:
Paul A. Schmidt,
By Dawson, Booth and Spangenberg
Attorneys.

Patented Aug. 8, 1950

2,517,722

UNITED STATES PATENT OFFICE 2,517,722

WIRE-WINDING APPARATUS

Paul A. Schmidt, near Earlville, Ill.

Application May 31, 1946, Serial No. 673,333

2 Claims. (Cl. 242—92)

This invention relates to wire winding apparatus and more particularly to apparatus for winding up or unwinding elongated strands of wire such as fence wire, planter wire and the like.

In many locations and particularly on farms, it is frequently necessary to lay or to rewind wires of various types such as fence wires, planter guide wires and the like. When performed by hand this is a tedious and laborious operation consuming a great deal of time and effort. Furthermore, in the case of barbed wire which is frequently used for fences, a great deal of care must be exercised to avoid injury.

It is one of the objects of the present invention to provide wire winding apparatus by which wire can be wound or unwound easily and quickly under uniform tension.

Another object is to provide wire winding apparatus in the form of a self-contained unit adapted to be drawn by a tractor or the like. According to one feature of the invention the power for winding up the wire is furnished by movement of the unit across the ground.

Still another object is to provide wire winding apparatus which forms a cart to carry extra wire, tools and the like and which is adapted to operate a reel for winding or unwinding the wire.

The above and other objects and advantages of the invention will be more readily apparent from the following description when read in connection with the accompanying drawing, in which—

Figure 1 is a perspective view of the wire winding apparatus embodying the invention;

Figure 2 is a side elevation;

Figure 3 is a top plan view;

Figure 4 is a partial perspective illustrating the mounting of the reel carrying shaft; and Figure 5 is a partial perspective of a sprocket and clutch.

The apparatus as shown comprises a cart having a platform 10 with elevated side rails 11 extending around the platform. The platform is supported for movement on a transverse central axle which carries wheels 12 at the opposite sides of the cart. Preferably the wheels are cleated as shown to prevent slippage when the cart is drawn over the ground. The cart may be pulled through a drawbar 13 extending forward from the central part of the platform and carrying at its outer end any desired type of coupling mechanism for connection to a tractor or other vehicle.

Adjacent the front of the car a reel supporting shaft 14 is provided extending transverse to the direction of movement of the cart with its ends projecting beyond the sides of the platform. As shown, the shaft is supported by a bearing block 15 which is pivotally connected through a pivot pin 16 to the cart adjacent one side. Adjacent the other side of the cart the shaft is journaled in a bearing block 17 which is slidably supported by an offset strap or bracket 18 secured to the platform 10. A coil spring 19 seated in the bracket 18 engages the bearing block 17 to urge it toward the front of the cart.

At the end adjacent the bearing block 17 the shaft carries a pulley 21. A belt 22 connects the pulley 21 to a pulley 23 mounted on a stub shaft adjacent the rear of the cart. The stub shaft rotatably carries a sprocket gear 24 which may be connected to the shaft through a clutch collar 25 carrying a spring pin 26 for engagement with a hole 27 in the sprocket hub. When the pin 26 is turned to the position shown in Figure 5, the sprocket will be disconnected from the stub shaft for free rotation thereon. This enables the cart to be drawn idly over the ground to a desired place of use without driving the reel as explained hereinafter.

The sprocket 24 is adapted to be driven through a chain 28 from a driving sprocket 29 carried by one of the wheels 12. With this construction when the cart is drawn over the ground with the clutch 26 engaged, the pulley 23 will be driven and will normally drive the pulley 21 through the belt 22, it being noted that the spring 19 acts in a direction to tension the belt.

At its opposite end projecting beyond the opposite side of the cart the shaft 14 is adapted to carry a reel indicated generally at 31 on which wire may be wound and from which wire may be unwound. As shown, the reel comprises a pair of end plates or discs 32, one of which carries a pair of U-shaped straps 33 lying at right angles to each other. The straps 33 preferably form an elongated slightly tapering hub portion for the reel to receive the wire. The opposite end 32 carries a series of short fingers 34 adapted to extend into openings in the straps 33 to prevent the wire from wedging between the ends of the straps and the end plate. Preferably the end plates 32 may be detachably mounted on the shaft 14 and are connected by the shaft so that when a spool of wire has been wound on the reel the wire can easily be removed therefrom to permit reuse of the reel.

Wire wound on the reel is guided by a level winding device comprising a rod 35 connected to the drawbar 13 and to an extension 36 at one side of the cart. The rod 35 has an enlarged end portion 37 which is cross threaded and on which a guide roller or pulley 38 rides. The pulley 38 may carry the usual thread engaging dog so that it will move back and forth on the threaded portion 37 as it is rotated.

In use of the device for winding up a wire the end of the wire is lead over the guide pulley 38 and may be hooked over one of the U-shaped straps 33 on the spool. With the main body of the wire extending forwardly from the cart, the cart is drawn forward by a tractor or the like in a direction along the length of the wire. As the cart moves, the shaft 14 will be driven through the sprockets, pulleys and belt 22 in a direction to wind the wire on the reel at a rate at least as great as the forward travel of the cart. As tension on the wire tends to increase, the reel will tend to move forward to swing the shaft 14 clockwise around the pivot point 16, as seen in Figure 3. This will tend to move the pulley 21 toward the pulley 23 loosening the belt 22 and interrupting drive of the shaft 14. By this mechanism the wire may be wound at uniform tension. For unwinding a wire, the clutch 26 may be disconnected so that wire will be drawn from the reel as the cart is pulled over the ground. It will be understood that extra spools of wire, tools, fence posts and the like can readily be carried on the cart.

While one embodiment of the invention has been shown and described in detail herein, it will be understood that this is illustrative only and is not intended as a definition of the scope of the invention, reference being had for this purpose to the appended claims.

What is claimed is:

1. Wire winding apparatus comprising a wheeled cart adapted to be drawn across the ground, a shaft support pivoted on the cart, a shaft journalled in the support and extending transverse to the direction of travel of the cart, a pulley on the shaft, a second pulley on the cart, a belt connecting the pulleys, means including a releasable clutch drivably connecting the second pulley to a wheel, a spring urging the support in a direction to tighten the belt, and a reel on the shaft on which a wire is adapted to be wound so that tension on the wire will urge the support in a direction to loosen the belt.

2. Wire winding apparatus comprising a wheeled cart, a drawbar extending centrally from the front end of the cart, a reel shaft extending transversely across the front end of the cart, a reel carried by the shaft at one side of the cart, means drivably connecting the reel shaft to a wheel of the cart, a forwardly projecting extension at one side of the cart, and a level wind device carried by the extension and the drawbar in register with the reel.

PAUL A. SCHMIDT.

REFERENCES CITED

The following references are of record in the file of this patent:

UNITED STATES PATENTS

| Number | Name | Date |
|---|---|---|
| 262,608 | Munson | Aug. 15, 1882 |
| 283,884 | Gunderson | Aug. 28, 1883 |
| 637,451 | Fahrmeier | Nov. 21, 1899 |
| 808,424 | Wyckoff et al. | Dec. 26, 1905 |